Dec. 10, 1929.   G. WALKER   1,738,807
DIRECTION INDICATOR AND RECORDER FOR SHIPS, ETC
Filed Jan. 25, 1923   10 Sheets-Sheet 1

Inventor:
George Walker
by Roberts, Roberts & Cushman,
Attys.

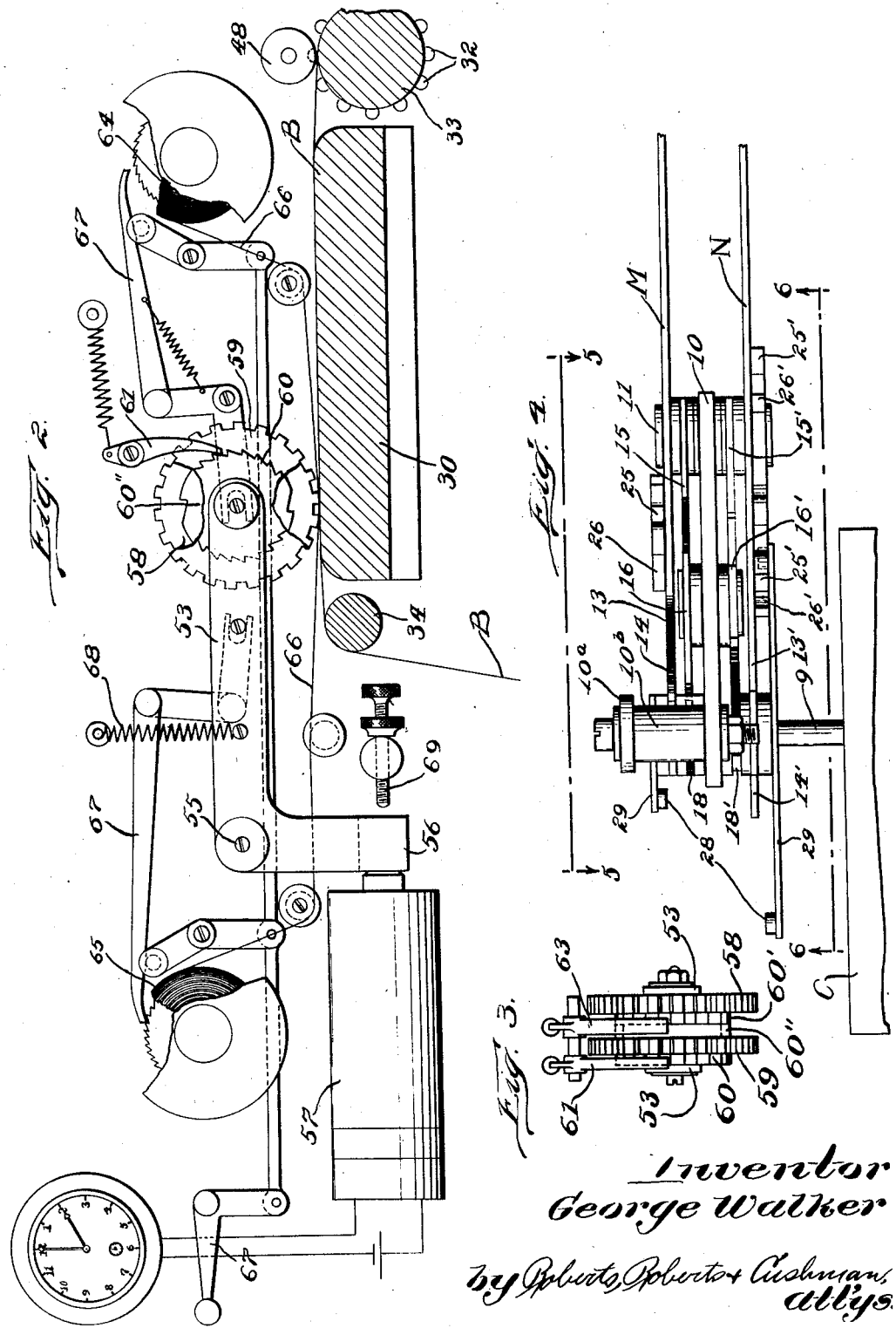

Dec. 10, 1929.    G. WALKER    1,738,807
DIRECTION INDICATOR AND RECORDER FOR SHIPS, ETC
Filed Jan. 25, 1923    10 Sheets-Sheet 3

Inventor
George Walker
By Roberts, Roberts & Cushman
attys.

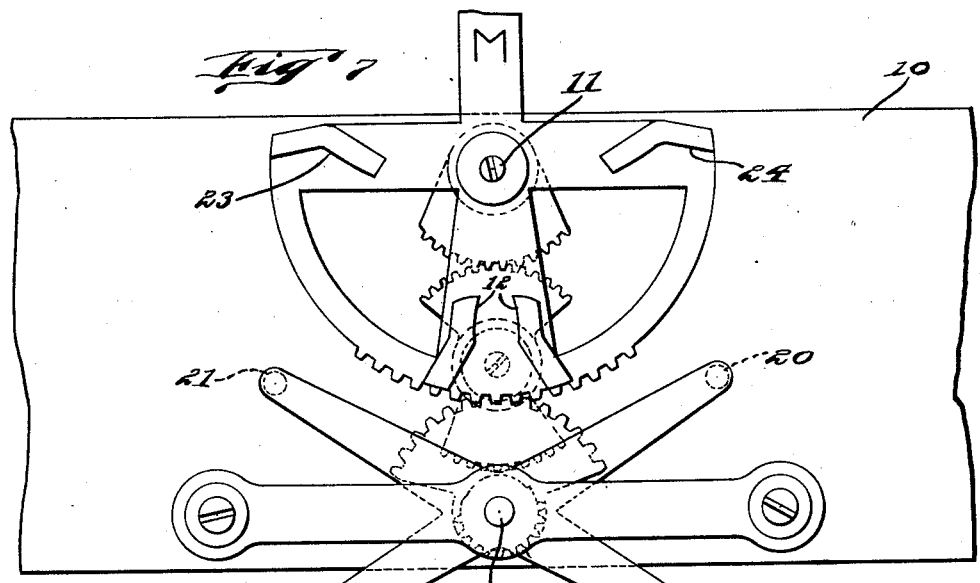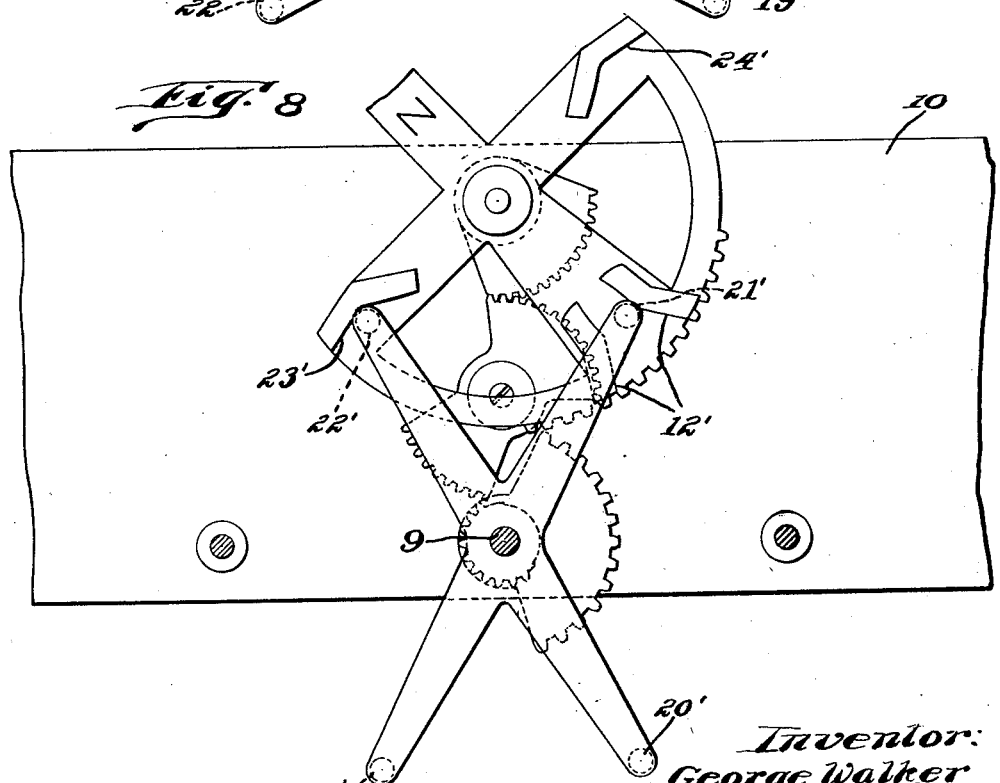

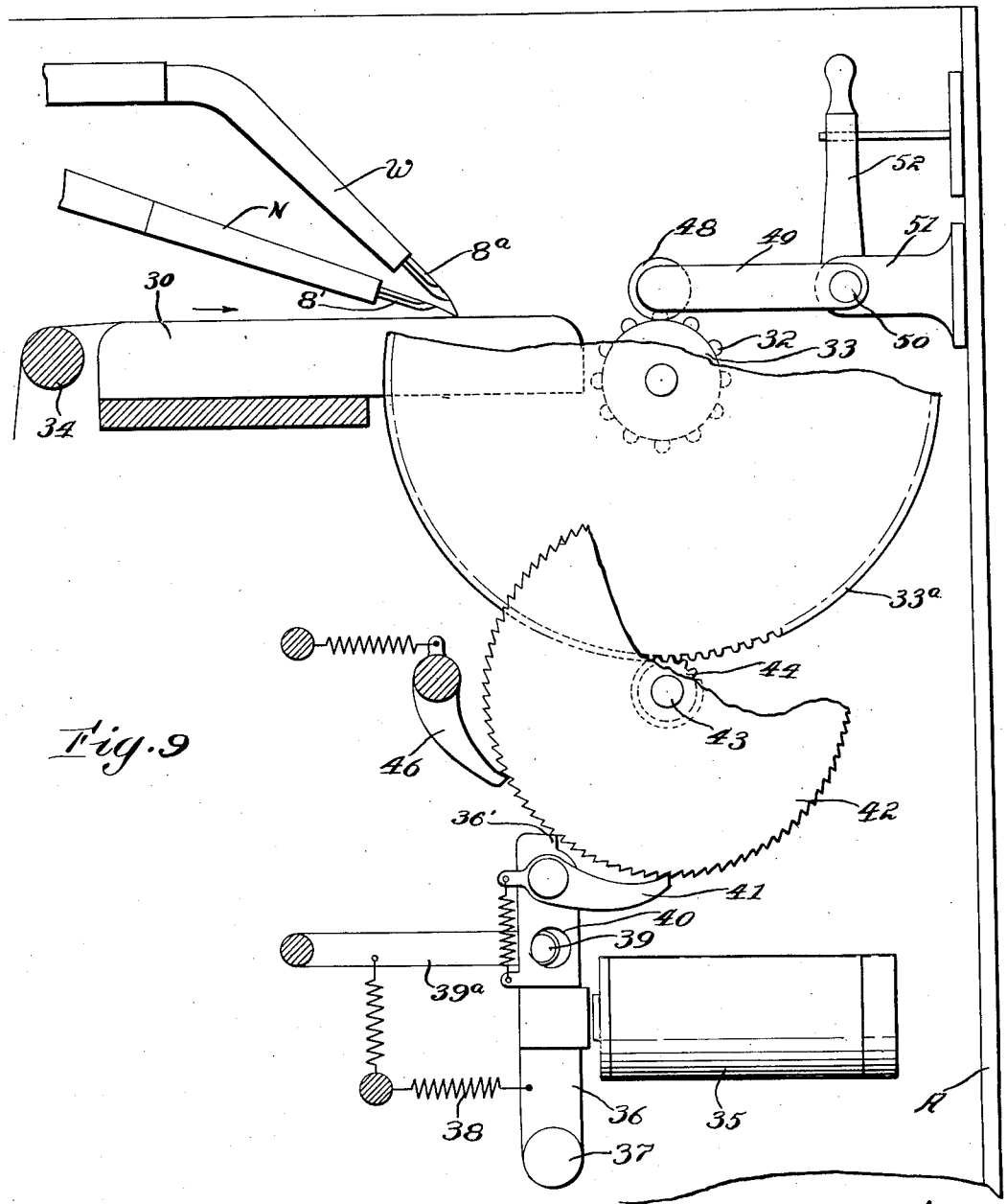

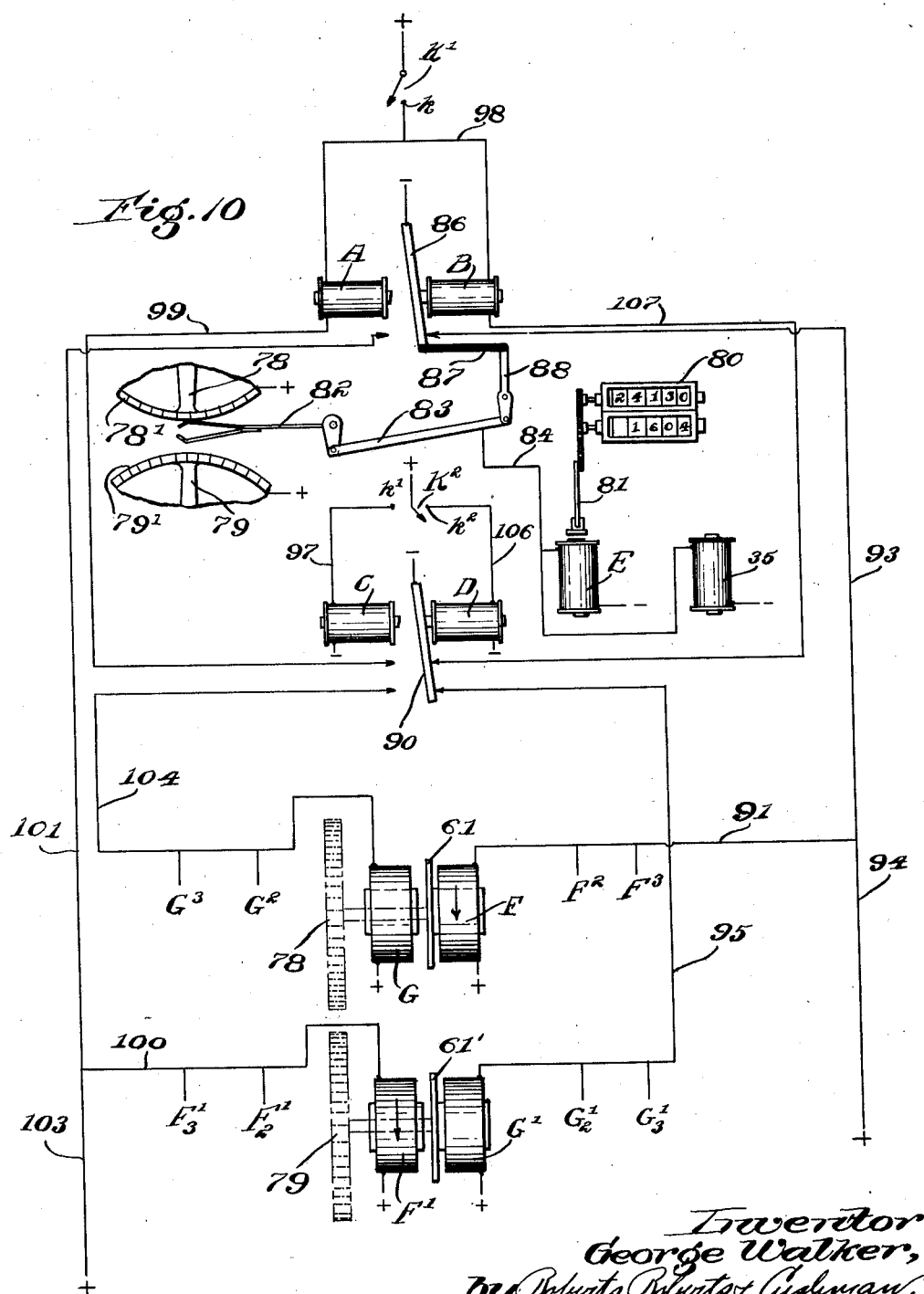

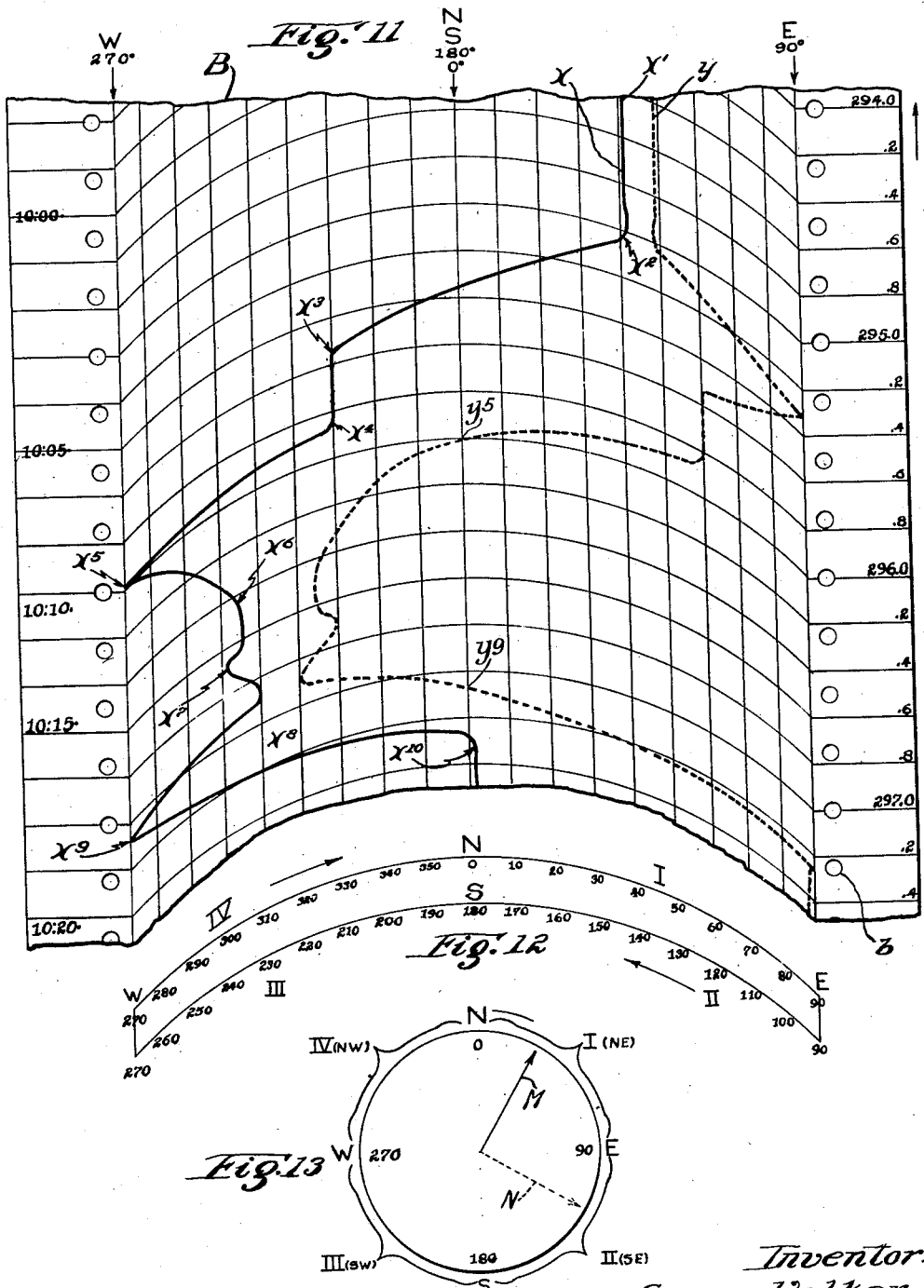

Dec. 10, 1929.  G. WALKER  1,738,807
DIRECTION INDICATOR AND RECORDER FOR SHIPS, ETC
Filed Jan. 25, 1923   10 Sheets-Sheet 8
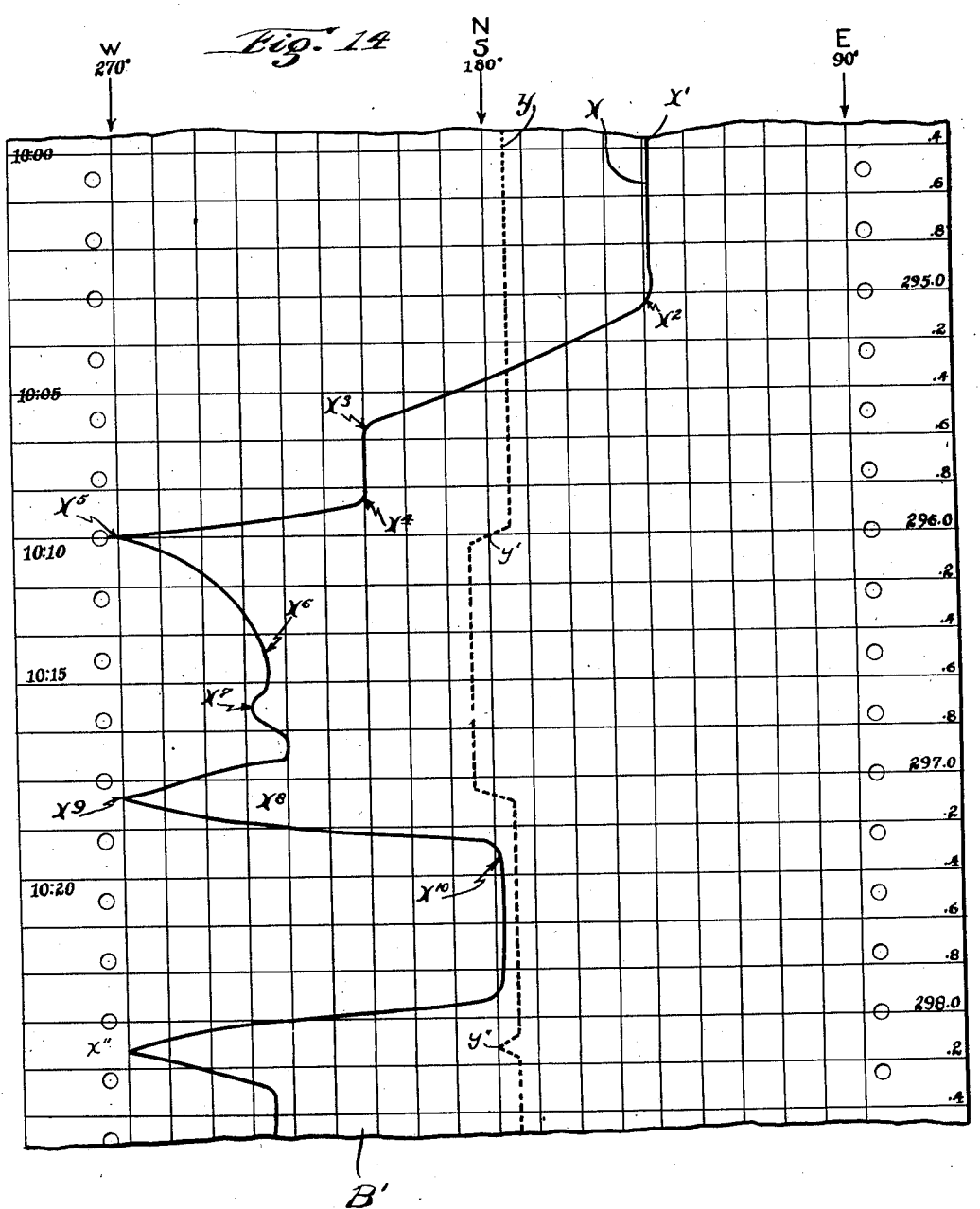

Dec. 10, 1929.  G. WALKER  1,738,807
DIRECTION INDICATOR AND RECORDER FOR SHIPS, ETC
Filed Jan. 25, 1923   10 Sheets-Sheet 9
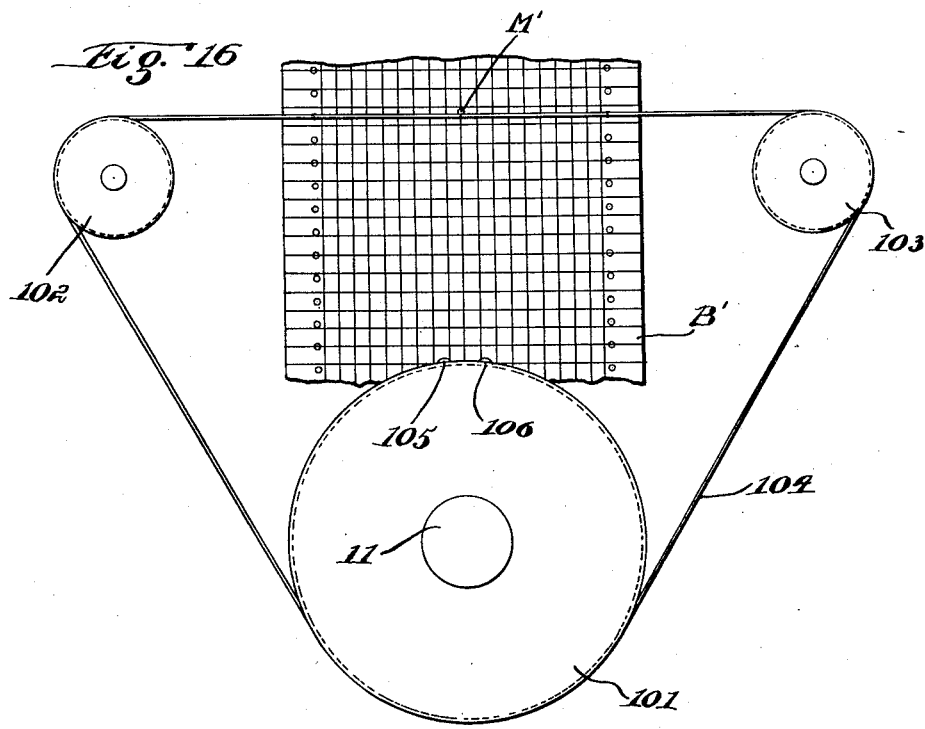
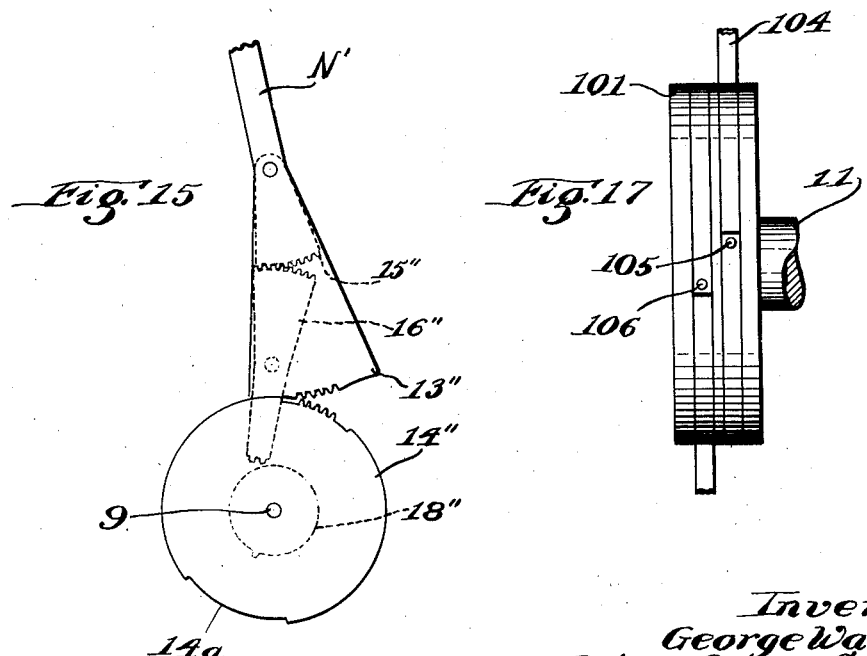
Inventor:
George Walker
by Roberts, Roberts & Cushman,
Atty's.

Dec. 10, 1929.  G. WALKER  1,738,807
DIRECTION INDICATOR AND RECORDER FOR SHIPS, ETC
Filed Jan. 25, 1923  10 Sheets-Sheet 10
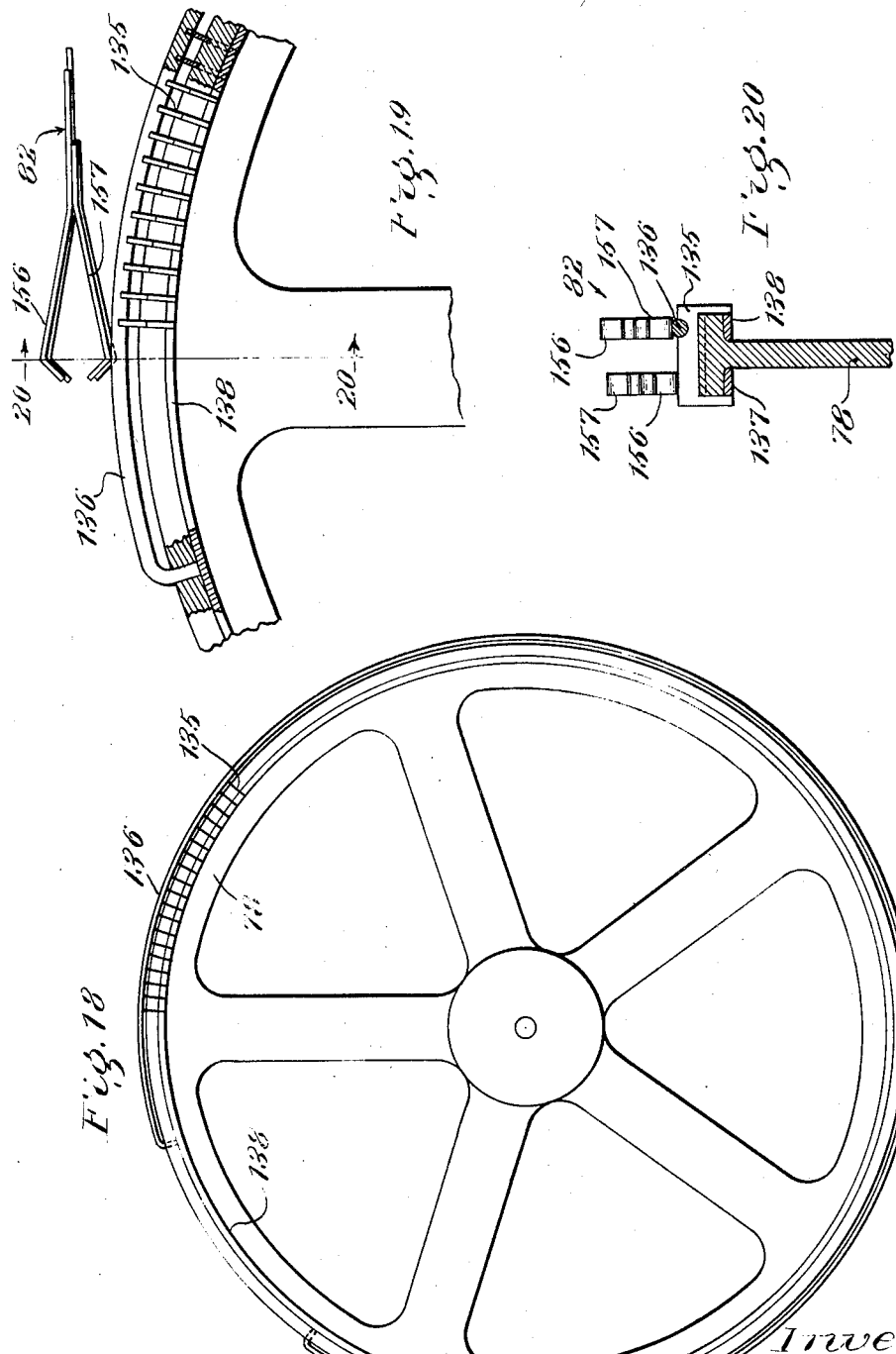
Inventor
George Walker Patented Dec. 10, 1929

1,738,807

UNITED STATES PATENT OFFICE

GEORGE WALKER, OF NEWTON CENTER, MASSACHUSETTS

DIRECTION INDICATOR AND RECORDER FOR SHIPS, ETC.

Application filed January 25, 1923. Serial No. 614,839.

This invention relates to direction indicators for automatically showing and preferably recording accurately and continuously, the angular movement, speed, distance traveled or elapsed time from a given point, or any or all of these, of a body or element; and to records produced thereby.

The invention includes apparatus for continuously indicating and preferably charting, for example, the geographic coordinates comprising the angular bearing or direction, the distance, and the related times of the path of a moving body in relation to the earth. The uses of the invention are manifold; it can be used with and read instead of a compass, or for all the purposes of a recording compass on ships, airplanes, or land vehicles; it can be used to indicate the direction and velocity of the wind, and for many other purposes.

The invention includes, as a product of the apparatus, a continuous record sheet or chart containing traces or other indications comprising an accurate contemporaneous plot showing the direction, the total distance, and the distance traversed in whatever direction, the rate of motion, the whole duration of the motion, and the relative and the absolute times of every component part of the whole motion, whatever course may be taken by the recording instrument or the ship, land-vehicle or airship carrying it. The record made is therefore a complete record of the geographic coordinates of a terrestrially-moving body, showing the times and rates of traverse from point to point and the times of deviation from angle to angle, however complex, in all of the course traversed.

A principal object of the invention is to provide a simple and effective type of indication and record which shall at all times be informative to the navigator of the facts in relation to the past course of the ship or other carrier, and its present course and position at any time.

In order to describe the invention, its operation and uses, concrete examples of the apparatus and its product suitable for use on a ship will be herein shown and described, but other forms of the devices and uses for other purposes and in other situations contemplated for the invention will be evident and will be clearly understood where not specifically mentioned below.

So far as I am aware, there is no satisfactory instrument adapted to aid the navigator by keeping before him a record of the past distances, times, and directions, and the present performance, of his ship. These factors of geographical position can be derived, with more or less accuracy, by calculation and plotting from observation of the performance of the ship, and checked by astronomical observation of the true position, but such observations and their interpretation heretofore have required time to reduce to the desired informative facts. The determinations of position have not always been accurate; there are long times when astronomical observations can not be made because of weather conditions, and dead-reckoning methods for interpolation between or exterpolation beyond the observations have been far from reliable. All calculations for navigation in relation to moving ships are thus necessarily related to a time before the results of the calculation are available and comprise exterpolated guess-work; it is one of the advantages of the devices herein described and claimed that by their use the navigator is informed of all the essentials of his course and true position continuously and contemporaneously, without waiting to derive these facts by calculation from past indications relied upon as a basis for their derivation.

Apparatus according to this invention preferred and hereinafter described in detail comprises devices for moving a continuous record sheet in accordance with and as a consequence of the distance traversed by the ship, and means for recording on this sheet the bearing in azimuth (the compass direction) of the ship at all times; for recording the related times; and, therefore, for recording and contemporaneously showing the rates of motion in whatever direction, as well as the distance actually traversed, and hence the position attained. The invention is in part concerned with providing a way of indicating progressively on a continuous record sheet progressive turning movements in any direction, including opposite or opposed directions, and the record made by the apparatus is distinguished from a map or chart plotting in proportional projection the actual motions of the ship by the inclusion in it of a symbolic indication distinguishing the indicated or plotted direction-angles of courses of one semi-circumferential series of angles, (e. g. 180° central on the north point) from those of the complementary semi-circumferential series (e. g. 180° central on the south point). This expedient enables the record to be a continuous strip of convenient width, without depriving its indications, present or past, of representation of course direction of graphic quality as an index of direction, and the times of changed direction.

To provide the indications, including the symbolic indication of the semi-circumference in respect to which recorded directions of course are to be read, the apparatus preferably includes a principal or main and an auxiliary direction indicator, both recording on the record-sheet, and at least one of them oscillating (through an arc or along a straight line) whose length represents proportionally the angular value of a semi-circumference, the locus of this motion lying crosswise of the direction of motion of the record sheet and within a convenient width, the position in its path of the principal indicator varying in accordance with the rotative position of the ship in relation to the earth.

Under these circumstances, the position of the principal indicator at any time recorded on the record sheet is a true measure of deviation of the direction of the axis of the ship from the geographical fundament chosen, such as the terrestrial meridian of the ship, which fundament is represented on the chart preferably by a median longitudinal line. In order to make the chart continuous, whole strokes or beats of the oscillation or reciprocation of the principal indicator are caused respectively to represent opposite halves of the horizon circle, for example, the northern semi-circumference and the southern semi-circumference; and the indication or record of the auxiliary indicator is relied upon to show whether the indication or record of the principal indicator relates to one semi-circumference or the other semi-circumference (e. g. the north half or the south half) of the horizon circle.

Preferably both the principal indicator record and the auxiliary indicator record are continuous traces on the moving record sheet; preferably the abscissæ of the record are a linear measure of the distance traversed, the rate of motion of the record being a function of the distance traveled in a given time; and to this end the motion may be variably proportional to the integral of the rate of the propulsive screws appropriate for a certain distance at a certain speed of the particular ship; and preferably the times are impressed upon the record in relation to the direction and distance indications to preserve a record of rate as well as of distance.

In the accompanying drawings:

Fig. 2 is a section on the line 2—2 of Fig. 1 showing a part of the record advancing mechanism and the time-printing mechanism;

Fig. 3 is a detail elevation of a part of the time printing mechanism;

Fig. 4 is a detail section on the line 4—4 of Fig. 1;

Figs. 7 and 8 are views similar to Figs. 5 and 6 showing a modification;

Fig. 9 is a right-hand side elevation of a detail of the parts shown in Fig. 1, in section on the line 9—9 of said figure;

Fig. 10 is a diagram showing a preferred system of electrical control for advancing the record sheet;

Fig. 11 is an elevation of a typical fragment of the record sheet;

Fig. 12 is a diagram showing in connection with Fig. 11 the relationship of the oscillatory path of the main and auxiliary indicators to the horizontal angles;

Fig. 13 is a diagram related to Figs. 11 and 12 showing the relations of the indications on the record sheet to the bearing of the compass needle indirectly controlling the respective indicators;

Fig. 14 is a modified diagram similar to that shown in Fig. 11; and

Figs. 15, 16, 17 indicate modified mechanisms for making a chart such as shown in Fig. 14;

Fig. 18 is an enlarged side elevation of one of the controlling members or wheels;

Fig. 19 is a detail view of a portion of the wheel shown in Fig. 18; and

Fig. 20 is a section on line 20—20 of Fig. 19 with additional parts shown.

Figure 5:
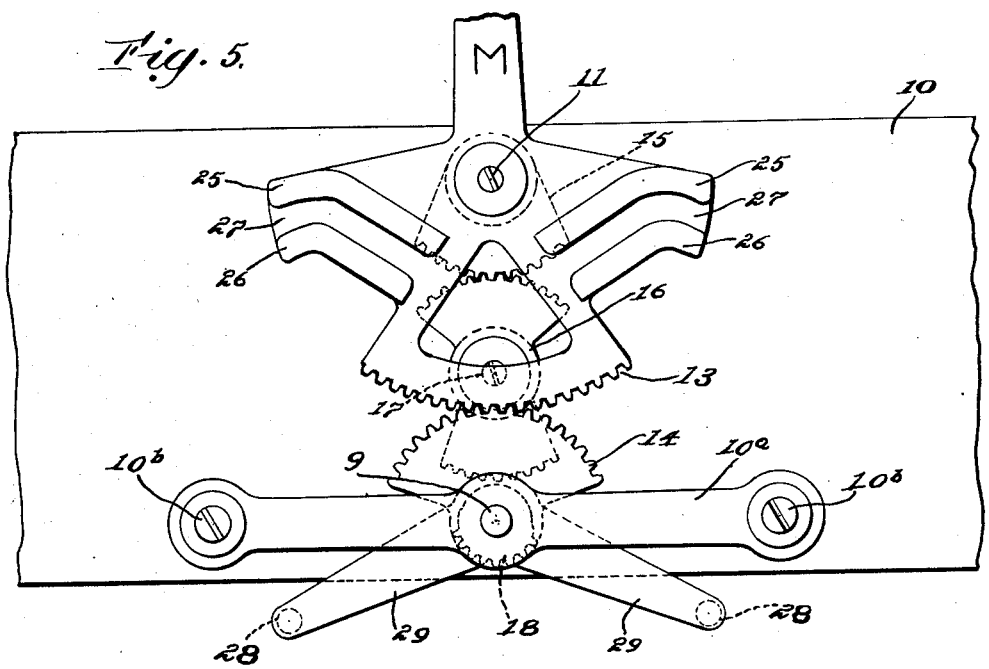
Fig. 5 is an enlarged plan, viewed from line 5—5 of Fig. 4, of the connections for oscillating the main indicator.

In one aspect the invention comprises a controller freely rotatable in response to changes in the orientation of the ship or other body or element, the course or direction or orientation of which is to be indicated or recorded, together with an indicator (which may be in the form of a recorder) movable to and fro in response to rotation of the controller. For use in a ship's instrument, for example, the controller may be interconnected with the ship's compass, either directly or through a repeating compass, so that the controller rotates relative to its support in exact accordance with the relative rotation between the compass indicator and its associated scale. In the embodiment shown in the drawings the controller comprises a shaft 9 (which may be the shaft of a repeating compass C, Fig. 4) having a full range of circular movement and means actuated by the shaft for moving the indicator to and fro, said means comprising any suitable mechanism for converting rotary movement into oscillatory movement (either rectilinear or circular). One suitable mechanism is shown in Fig. 5 wherein 14 and 18 are opposite segmental gears fast to shaft 9 and alternately operative upon similar gears 13 and 15 fast to the main indicator M, 16 is an intermediate double segmental gear pivoted on shaft 17 and meshing with gears 15 and 18 respectively, and 28 are cam followers carried by arms 29 fast on shaft 9, the cam followers cooperating with cam grooves 27 defined by guides 25 and 26 on the main indicator M. The gears are so correlated that when gears 13 and 14 disengage, upon rotation of shaft 9 in either direction, kinematic connection is established between the shaft 9 and indicator M through gears 15, 16 and 18, and vice versa. The cam grooves 27 and followers 28 are so correlated with the gears as to maintain the kinematic connection during the brief interval between the shift from one set of gears to the other, and to reverse the motion of the indicator, the shape of the cams being such as to maintain the same ratio of movement between the shaft 9 and the indicator. Inasmuch as the connection through gears 13 and 14 is direct and the connection between gears 15 and 18 is indirectly through the intermediate gear 16, the indicator rotates in a direction opposite to that of the shaft while gears 13 and 14 are in mesh and in the same direction as the shaft while gears 15, 16 and 18 are in mesh. Thus the motion of indicator M is reversed at each change from gears 13—14 to gears 15—16—18 and it is during these changes that the cams and followers function to maintain the angular relationship between the shaft 9 and indicator M. While the kinematic connection between shaft 9 and indicator M may be arranged to oscillate the indicator through any desired arc or distance and at such rate that any desired number of oscillations are made during one revolution of the shaft, the particular mechanism chosen for the purpose of illustration oscillates the indicator through an arc of 90° at a speed ratio of one complete oscillation (to and fro) for each revolution of shaft 9.

Figure 6:
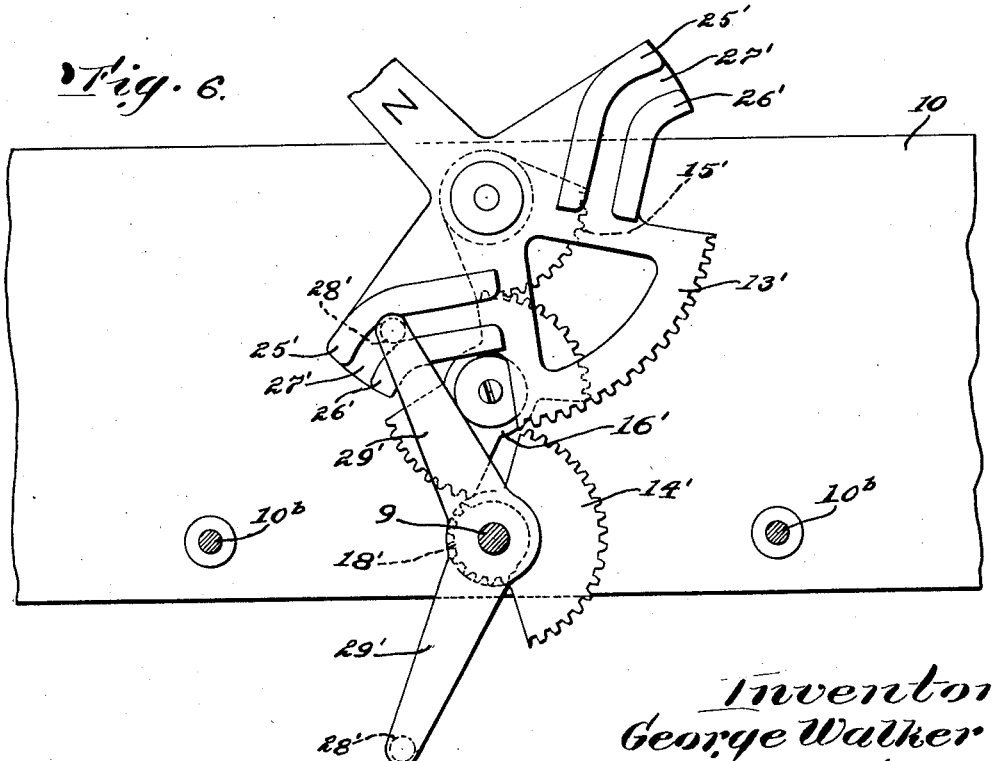
Fig. 6 is another plan, viewed from line 6—6 of Fig. 4, of the mechanism for oscillating the auxiliary indicator.

The mechanism for actuating the auxiliary indicator N may be entirely different from that employed to actuate the main indicator M but for simplicity of illustration Figs. 4 and 6 show similar mechanism, corresponding parts being correspondingly designated.

The gears 14' and 18' of the auxiliary indicator mechanism are angularly displaced on shaft 9 relatively to the corresponding gears 14 and 18 of the main indicator for a purpose hereinafter described, the angular displacement being 90° in the illustration so that one indicator is always displaced from the other one-quarter of one oscillation.

As shown in Figs. 1, 4, 5 and 6 the shaft 9 is journaled in a cross-plate 10 and a cross-bar 10ª mounted on plate 10 by posts 10ᵇ, the main indicator mechanism being in front of the plate 10 and the auxiliary indicator mechanism behind the plate.

Figs. 7 and 8 are like Figs. 5 and 6 except in that the cams and cam followers are different. The indicator M carries two opposing cams 12 and two other cams 23 and 24, and the shaft 9 has four cam followers 19, 20, 21 and 22 arranged to engage cams 12, 23 and 24 in pairs (see Fig. 8), followers 20 and 21 engaging cams 12 respectively and followers 22 and 19 engaging cams 23 and 24 respectively. The cams and followers for the auxiliary indicator may be similarly arranged as shown in Fig. 8. This modified arrangement of the cams and followers reduces the lost motion to a minimum because two followers function simultaneously to hold the indicator against angular movement in either direction relatively to the shaft 9.

Figure 1:
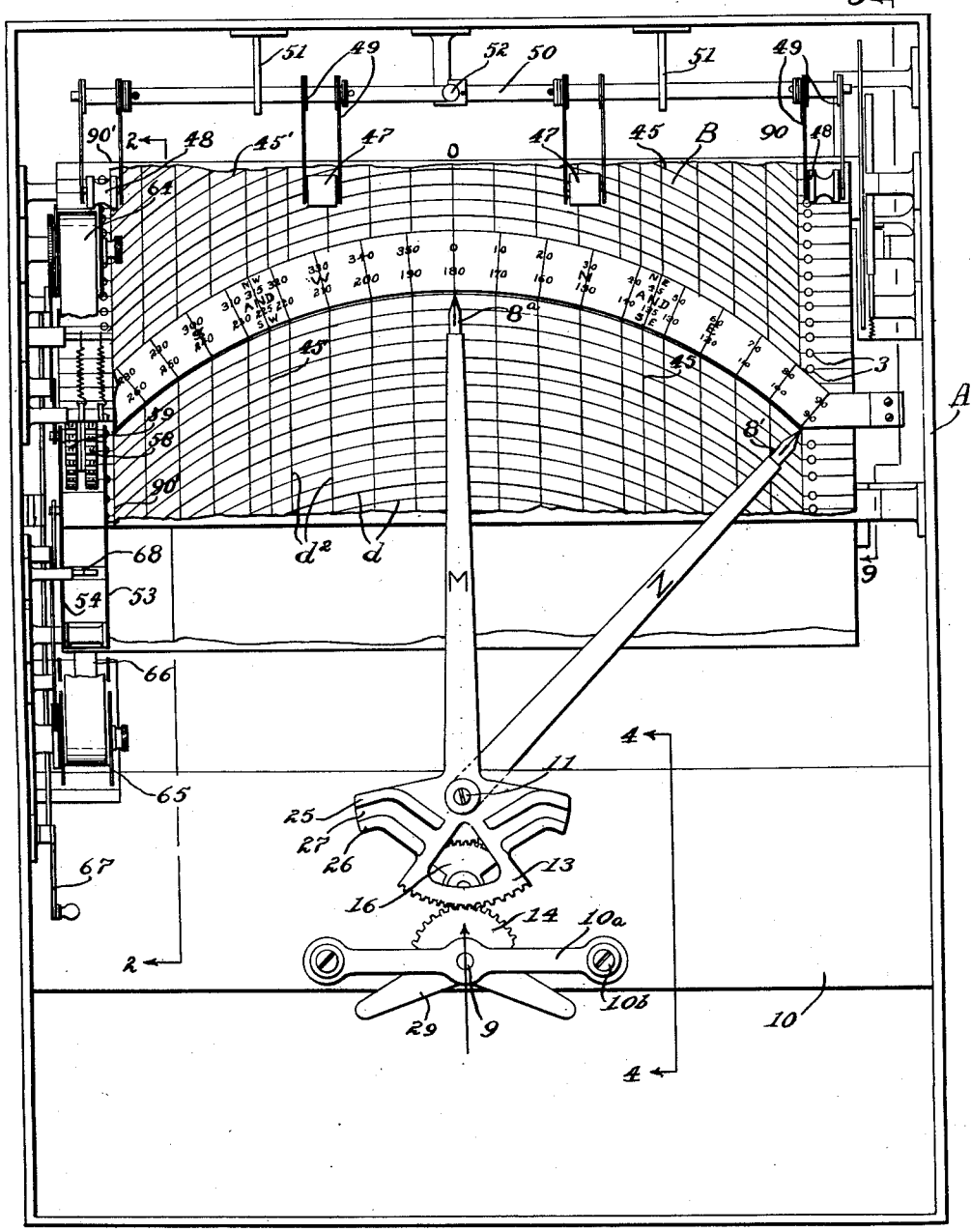
Fig. 1 is a plan showing the indicators and record sheet.

The indicators M and N may be adapted to record the indications in any suitable way as for example by mounting stylii thereon as illustrated at 8ª and 8' in Figs. 1 and 9 and feeding a record sheet thereunder. In order to render the apparatus continuously operative over a long period of time and for convenience of manipulation and facility of reading, the record sheet is preferably in the form of an elongate ribbon which may be continuously fed from a supply reel under the recording apparatus and thence to a take-up reel. Thus in the drawings I have shown a form of the invention in which an elongate record sheet B is continuously fed from a feed reel not shown, over a guide roller 34 (Figs. 2 and 9) a recording table 30 mounted in frame A, the sheet being advanced by a wheel 33 having sprocket teeth 32 engaging perforations 3 in the margins of the sheet (Fig. 1). As shown in Figs. 1 and 9 pressure rolls 47 and 48 may be employed to hold the sheet on the table and sprocket wheels respectively and these pressure rolls may be mounted on arms 49 fast to shaft 50 which is pivoted on brackets 51 and controlled by handle 52 to facilitate threading the sheet into the instrument.

The sprocket wheels may be advanced in various ways, one suitable means being shown in Fig. 9 wherein a gear 33ª fast to the sprocket wheel shaft meshes with a gear 44 on shaft 43, shaft 43 having fast thereon a ratchet wheel 42 controlled by driving pawl 41 and holding pawl 46. When using an electric drive (in contradistinction to mechanical or pneumatic drive) the driving pawl 41 may be actuated by an electromagnet 35 through an arm 36 pivoted at 37 and retracted by spring 38. The projection 36' of armature 36 acting against the teeth of ratchet wheel 42 (Fig. 9) prevents over-throw of the wheel when operated by pawl 41. Lug 39 on arm 39ª cooperates with an opening 40 in arm 36 to limit the throw of the driving pawl 41.

The recorder moves to and fro transversely across the path of the record sheet and in the preferred form illustrated in the drawings the diameter of the circular path of the recorder is greater than the width of the sheet, whereby the full circular movement of the controller is recorded within a relatively narrow width.

The time at which successive portions of the traces are made may be indicated on the margin of the record sheet, suitable mechanism for this purpose being shown at the left-hand side of Fig. 1 and in Fig. 2. The particular mechanism shown in the drawings comprises two number wheels 58 and 59 rotatably mounted in the end of bell-crank 53 pivoted at 55, a magnet 57 controlled by a chronometer for actuating the bell-crank at timed intervals, and a spring 68 for lifting the bell-crank to raised position. If it is desired to print the time on the record sheet every five minutes for example, wheel 59 may be provided with two series of numbers from 5 to 60 (5, 10, 15, etc.) and the wheel 58 with a single series from 1 to 24 (1, 2, 3, etc.), the magnet 57 being energized at the end of each five minutes. As shown in Fig. 3, the pawl 61 engages ratchet 60 fast to wheel 59 and the pawl 63 engages ratchet 60' on wheel 58, a cam 60" fast to wheel 58 serving to hold the pawl 63 out of engagement with ratchet 60' except at each twelfth rise of bell-crank 53. Thus, the wheel 59 is turned one step every time it rises and the wheel 58 is turned one step each twelfth time the wheels are lifted by springs 68, thereby marking the record sheet very five minutes as follows: 0:05; 0:10; 0:15; ----23:50, 23:55, 0:00. If the record sheet is driven at a rate proportional to the speed of the ship whether constant or variable (e. g. one inch to the mile) the distance between any two time markings indicates the distance traveled in the interim, and inasmuch as the speed of the ship is a function of the time and distance, the speed of the ship during any interval may be determined from the record sheet. The marker wheels may mark the record sheet by imprint, by using an automatic ink-roll, or by the use of an ink ribbon as shown in Figs. 1 and 2 wherein 64 and 65 are ribbon rolls, 66 the ribbon, and 67 mechanism for advancing the ribbon step by step.

Apparatus for driving the record sheet at a velocity proportional to the velocity of the body or element the direction of which is to be recorded is disclosed in my copending applications Ser. No. 614,838, and Ser. No. 614,842, filed on even date herewith, one system being illustrated in Figs. 10, 18, 19 and 20 wherein the parts are designated in the same way as the corresponding parts in Serial No. 614,842.

The control system illustrated in Fig. 10 is constituted as follows:

The wheels 78 and 79 are identical and are each driven at the same speed as the propeller shaft or in a constant ratio thereto. Each wheel may be formed of bakelite or other insulating material carrying on its periphery a series of non-uniformly distributed electric contacts 135 (Fig. 18) and a circumferential contact wire or bar 136. The contacts 135 are U-shaped and may fit in grooves extending transversely across the periphery of the wheel and thence radially across the peripheral flanges of the wheel. The ends of the contacts may be soldered to rings 137 and 138 respectively which fit under the wheel rim as shown in Fig. 20. The contact bar 136 lies in grooves in the contacts 135 and its ends extend radially inwardly from the wheel rim to ring 138. The bar 136 may be soldered or welded to the contacts 135 and the ends of the bar may be soldered or welded to the ring 138. The series of contacts 135 are distributed in accordance with the relationship between propeller speeds and distances traveled of the particular ship upon which the wheel is to be used. Preferably this is done by taking a series of readings at different speeds and comparing the ship's speeds and the propeller speeds or, in other words, experimentally finding the proper allowance to be made for propeller slippage at various speeds.

The switch member 82 which is adapted to swing into engagement with the periphery of one or the other of wheels 78 or 79, is provided with a pair of contact spring members 156—157 adjoining each wheel and is adapted to be swung by electro-magnetic means, which will presently be described, from a position wherein one of the pairs of contact springs 156—157 may form part of a circuit passing through a contact on one wheel to a position where the other pair may be in a similar relation to the other wheel. The spring contacts 156 and 157 are so positioned that one slides on the conducting bars 136 (Figs. 18 to 20) and the other wipes over contacts 135 leaving each contact before engaging the next succeeding contact, thus serving intermittently to energize magnets E and 35 as each contact is engaged by the spring 156. The wheels function alternately, one wheel advancing during one period of time (one minute e. g.) and the other wheel advancing during the next interval, and so on, each wheel being reset to initial position while the other wheel is advancing. K' is a chronometer switch which momentarily contacts k at the end of each interval and K² is a chronometer switch which contacts k' and k² just before the ends of alternate intervals respectively, thus energizing magnets C and D alternately, just before the ends of alternate intervals. The armatures 86 and 90, which are controlled by the said magnets, are of any of the well-known types which remain in either extreme position until thrown over into the other extreme position. Switch 82 is adapted to be moved into contact with either of the wheels 78 or 79 by means of connections 83, 88 and 87 with armature 86. E is a magnet, energized alternately through wheels 78 and 79, and thence through switch 82, arm 83 and conductor 84, which actuates the distance indicator 80 through pawl and ratchet mechanism 81. The magnet 35, which drives the record sheet as shown in Fig. 9, is connected in parallel with magnet E. The magnets G and F control the upper wheel 78 and the magnets G' and F' control the lower wheel 79. Magnets F and F' constantly rotate, as indicated by the arrows thereon, at a velocity proportional to the average speed of the propeller, while magnets G and G' are stationary. 61 and 61' represent armatures which are connected to the wheels 78 and 79 respectively so that each wheel is driven when its rotating magnet is energized and is stopped and held stationary when its stationary magnet is energized, all as described in said application Ser. No. 614,833. For use on a ship having a plurality of propellers, magnets similar to F, G, F' and G' are associated with each propeller, as indicated at $F_2$, $G_2$, $F'_2$, $G'_2$, etc., and as described in said application.

The operation of the system shown in Fig. 10 is as follows: With the parts in the positions shown magnets E and 35 are operating under the control of upper wheel 78. Just before the end of the contemporaneous minute or other interval chronometer switch K² closes circuit through magnet C, (contact k' and conductor 97) thereby shifting armature 90 to its alternate position (1) to condition circuit 99 to energize magnet A when switch K' closes at the end of the interval and de-energizing magnet G' (by breaking the circuit 95 at 90) to release armature 61' to permit lower wheel 79 to be reset by its resetting spring, and (2) to energize magnet G through 104. However armature 61, being in contact with magnet F, remains in frictional engagement therewith until the latter is de-energized. At the end of the interval chronometer switch K' closes circuit through magnet A to shift armature 86 to its left-hand position, thereby simultaneously effecting three changes, viz: de-energizing magnet F (by breaking circuit 86, 93, and 91) thereby permitting magnet G (through circuit 90, and 104) to shift armature 61 from the rotating magnet F to the stationary magnet G and thereby stopping and holding the upper wheel 78; energizing magnet F' (through circuit 86, 101 and 100) magnetically to clamp armature 61' thereto and thereby start lower wheel 79; and shifting switch 82 from the upper wheel 78 to the lower wheel 79, thereby placing the magnets E and 35 under the control of lower wheel 79 for the next interval. Just before the end of this interval chronometer switch K² contacts k², thereby shifting armature 90 to its right-hand position to effect the following changes, viz: magnet G is de-energized to permit the upper wheel 78 to reset, and the circuit of magnet G' is closed. At the end of the interval chronometer switch K' closes the circuit of magnet B, thereby throwing armature 86 to its right-hand position simultaneously to effect the following changes, viz: magnet F' is de-energized and magnet G' acts on armature 61' to stop and hold lower wheel 79; magnet F is energized to start the upper wheel 78; and switch 82 is shifted from lower wheel 79 to upper wheel 78. Thus magnets E and 35 are continuously but alternately controlled by wheels 78 and 79.

Referring now to the record sheet illustrated in Fig. 11, inasmuch as the record sheet is advanced at a rate proportional to the distance traveled by the ship, whether at constant or variable speed, the sheet B is moved forward through a given space, e. g. the space between successive holes b, during the progress of the ship through a given distance. These values for distance traversed are subject normally to no corrections, but storms and oceanic currents may introduce, as in any navigation, factors in respect to which the record must be interpreted in order to find the true position. The record itself contains the data for these emendations, which are commonplaces of navigation. For purposes of explanation let it be assumed that an advance through the distance separating the holes b occurs each fourth of a nautical mile.

Assuming a record trace to be formed upon the sheet B as it passes a fixed transverse line, it will now be apparent that abscissæ measured by the length of the sheet, or marked off in accordance with the positions of the holes b, will, in connection with the trace, show the advance of the ship through the distance represented by the intersection of the trace with transverse lines representing successive positions of the sheet B. These lines are preferably imprinted, as at d, on the sheet, and may be the same in number as the holes b, and represent any desired distance. The sheet may or may not have imprinted upon it as illustrated on the right-hand side of Fig. 11 a scale of nautical miles; if, as assumed above, the distance between adjacent lines $d$ represents progress of a fifth of a mile, the fragment of the sheet B shown in the figure is representative of travel for about three miles, and any trace formed upon this fragment of the sheet B will be related by the indications of this trace to the position of the ship represented along its past course of travel and indicated by the scale of miles or other distance measurement shown by the longitudinal extent, which is the same as the total surface motion of the roll 33, as above explained.

I prefer to mark off the chart or sheet B by printing upon it as shown a scale of equidistant principal transverse divisions $d$, representing parallels to the axis of abscissæ of the record. Preferably these extend from side to side of the sheet as shown and when the recorders move along curved paths instead of straight lines, are curved to correspond to the radius of curvature swept by the principal indicator M relied upon to trace the successive positions of the ship. For apparatus such as shown in Fig. 1, the radius of curvature is that of the point of the tracing pen $8^a$ in respect to the center of oscillation 11. In the preferred forms of the apparatus shown it is desirable to arrange the pens $8^a$ and $8'$ to mark on substantially the same radius either by allowing a slight clearance or arranging one recording arm to ride over the other when the two arms pass each other.

As explained above, the ordinates of a curved tracing on the record sheet B are relied upon as a primary record of the direction of progress of the ship. These may be read by the scale afforded by the longitudinal lines $d^2$ corresponding to each ten degrees, or other convenient division, of the compass direction.

The fundament or axis of the ordinates of the tracing may conveniently be taken as the central longitudinal line NS of the sheet, representing the terrestrial meridian of the ship.

Referring now to Figs. 1 and 13, the ship's compass (or the director of its gyroscopic compass or repeater) is connected directly or indirectly to control the shaft 9, as explained above, of the indicator apparatus. Assuming that the vessel is rotating so as to bring its longitudinal axis from north through east, to south, to west, to north again, the shaft 9 will be terrestrially a fixity, but will turn through one complete revolution (counter-clockwise as shown in Fig. 1) in relation to the ship during this motion of the ship. The main indicator M during this revolution will make one complete oscillatory traverse of its arc. If the ship first headed north and the tracer $8^a$ rested upon the line NS of the record B at the beginning, the corresponding rotation of the ship through east, south and west back to north would occasion the tracing point of the indicator M to travel first to the right until the ship was pointing due east; then to travel back to center when the ship was pointing due south; then to travel to the extreme left of its path, when the ship was pointing due west; and then to return to the center position as the ship resumed its north-pointing direction.

Now if we assume the record sheet B to have moved forward in accordance with a motion of translation of the ship, as will be the case if the turning movement assumed were occasioned by travel of the ship about a circle having any substantial diameter, the forward motion of the chart B would relate a trace left by the main indicator M to progress in this circle. The longitudinal distance between the beginning and end of the complete oscillation representing the circle would measure the length of the circumference of the circle, the distance sailed. But if during the performance of such a circle, the ship held her way on any tangent then attained, the trace left by the main indicator would thereafter, so long as this direction was held, be parallel with the line NS, and displaced from it proportionally to the angular deviation from the meridian. Merely observing the position of the indicator, supposing the motions of the ship to have occurred at an earlier time, or not to be recorded, would not now inform the observer whether the position of the index had been attained on a swing to the left or on a swing to the right, and therefore would not inform the observer whether the index position referred to the north sector of the horizontal circle, or to the south sector. But the position of the indicator would unmistakably show $(a)$ whether the direction was in one of the quadrants I or II, Fig. 13, or in one of the quadrants III or IV; and $(b)$ its angle to the meridian; and $(c)$ the mechanical relationship of the gearing between the shafts 9 and the main indicator being as described, the angular deviation away from the meridian center line NS of the trace would be directly proportional to the angular deviation of the compass needle from the zero or north point, or the 180° or south point. In other words, the position of the main indicator or of its trace $x$ on the chart B is a graphically-readable measure of the angular position of a ship when the trace is made, for every part of the trace, lacking only something to discriminate between southerly directions, (i. e. south of the east or west point,) and northerly directions (i. e. north of the east point or the west point).

The invention therefore includes a record sheet or chart B having not only an indication of the deviation of the longitudinal of the ship from the meridian, but also having an accompanying auxiliary symbol, legend, or other index showing in relation to the position attained at any time by the main indicator, to what sector or semi-circumference of the rotation of the compass needle the position of the main indicator applies; and means for automatically recording this symbol. A preferred way of effecting this is to provide the record with a second or auxiliary trace $y$ made by the second or auxiliary indicator N, which is adapted and arranged to make the same reciprocating or oscillating motions as the main indicator M, but always to lag behind (or to lead) the main indicator by a fixed angular difference of position; for example, by 90° in respect to the motions of the shaft 9 and the corresponding motions of the compass needle or gyroscopic director.

Referring to Fig. 13, if the angular position of the compass needle or director be expressed in circular measure with the zero at north and increase in the clockwise direction, so that east is 90°; south, 180°; and west, 270°, a convenient and preferred arrangement corresponding to Fig. 1 will provide an auxiliary indicator N receiving its actuations from a point on the shaft 9, 90° distant from, clockwise, the position of the main indicator M. It therefore follows that the trace from the auxiliary indicator N, whenever the main indicator has passed the zero point (the NS line) going to the right will already have reached the limit of its oscillatory motion to the right and will have begun to return toward the left. But the auxiliary indicator N will pass the center line NS going to the left, when the main indicator reaches the left-hand margin.

The indicator N will then reach its left extreme when the main indicator passes the meridian line going to the right. So, in respect to positions of the compass gnomon and the corresponding positions of the main indicator M, a position of both the auxiliary indicator and main indicator on the right side of the center line (or after the fact, by the traces left by the indicators M and N) will show the direction of the ship to be in the northeast quadrant I. A position of the main indicator to the right and the auxiliary indicator to the left shows the direction to be in the southeast quadrant II. A position of both main and auxiliary indicator to the left of the center line shows the direction to be in the southwest quadrant III. A position of the main indicator to the left and the auxiliary indicator to the right shows the direction to be in the northwest quadrant IV.

I prefer to limit the oscillation of the main indicator to an arc of about 90° in order to prevent any possible confusion in reading the chart or record sheet B in respect to the distances traversed, which are of course read by comparing the position of the indicator or its trace with the lines $d$, and if desired, with the actual count of miles printed or stamped on the right-hand margin as shown in Fig. 11. By the devices I have described, the angular deviations of the ship and the compass away from the meridian are proportionally reduced so that 180° of angular deviation for the north semi-circumference is represented by one 90° stroke of the oscillation, whereas 180° of the turning motions of the ship for the south semi-circumference are represented by positions in the other stroke of the 90° arc of oscillation. Measured along the lines $d$, the angular deviation of the ship is then twice what is shown by the distance away from the 0—180° fundament line NS. When taken with the symbolic indication above referred to, preferably the auxiliary trace $y$, the information afforded by the trace left on the record sheet or chart B is exact and constant. Preferably the record paper has the angles laid off on it as shown, the customary clockwise notation in degrees of arc for the horizon circle being sufficiently pointed off by the longitudinal lines $d^2$ separated by 5° of the actual motion of the main indicator. These divisions each represent 10° of turning movement, as will now be apparent.

Referring to Fig. 11 the fragment of the record sheet shown comprises a main indication shown as a trace $x$, and a symbol accompanying this trace to indicate the sector of the horizon with respect to which its indications of direction shall be read, shown in an auxiliary trace $y$, the record sheet or chart shown in illustration of the genus of the invention being the specific product of apparatus such as that illustrated in Fig. 1.

The trace $x$ begins, on the fragment shown, at $x'$, and there indicates that the ship was on a course north forty-one degrees east, which was maintained for 0.6 miles to the point indicated on the record sheet at $x^2$, where the course was changed through north to thirty degrees west of north (330° by the usual azimuth notation), the bearing 330° being attained at the point $x^3$, whereupon the ship straightened out on this course, with some steering divagations. The length of the turn from $x^2$ to $x^3$ measured circumferentially in the line of progress of the ship is shown by the record to be 0.5 miles and the angle 71°. That the direction was changed from east of north to west of north is shown by the auxiliary trace $y$, which is to the right of the meridian line NS. At $x^4$ the navigator changed the course westerly to south fifty-five degrees west (235°) which new course was attained at $x^6$. This new course was reached by a turn of 95°, the turn occupying 0.6 miles of linear progress, the radius of curvature (degree of departure from normal of the steering gear) being increased when the ship bore due west as shown at $x^5$. Trace $y$ crossed the meridian line at $y^5$, and thus indicated that the corresponding angular reading of the main trace $x$ thereafter applies to the southerly semi-circumference. At $x^7$ the ship made a slight turn through four degrees to west and then nine degrees to southwest to the point $x^8$; whence the navigator swung his ship through west to north during progress of 0.3 miles to the point $x^{10}$, whence the course north one degree east was assumed and maintained. When the ship headed as at $x^9$ due west, swinging to north, the trace $y$ crossed the meridian line at $y^9$, showing that the trace $y$ thereafter is to be read for angles in the northerly semi-circumference.

The time-writing arrangement above described produced the following features of the record chart:

At a convenient place, for instance on the left-hand margin at $t$, the time was annotated on the record sheet in relation to the other records. The point $x'$, for instance, was shown to have been traced on the ordinate indicated by 10 h. 0 min., and five minutes later the ship was in the midst of the turn from $x^2$ to $x^3$ and had traversed one mile. The speed was, therefore, twelve miles an hour, but in the ensuing five minutes up to 10 h. 10 m. the ship traveled only .7 of a mile, and this rate was further reduced just before the sharp but slight turns at $x^7$, $x^8$; but prior to resuming the course north one degree east at $x^{10}$ the speed increased to .85 miles in the five-minute period arbitrarily indicated by the marginal stamp of the time-writing mechanism.

It will be observed that this record or chart graphically shows the distance traversed by the ship, the direction at all times of its progress, and the speed at all times. Where it is necessary to correct the indications graphically and automatically shown by such a chart, the chart itself will be found to contain the data. For example, in stress of wind and weather the revolution count as weighted by the constants of the ship may have to be further evaluated as a consequence of the resistance to forward motion; this is shown by alteration of the ratio of distance to elapsed time. Or the direction and distance indications taken together may have to be modified by the effect of lateral way due to currents or winds. It is no part of the purpose of the present invention to perform these calculations, but aided by the chart afforded by this record, the navigator is in possession of all of the facts necessary to accurate determination of his position (e. g. evaluated revolution counts in terms of distance; elapsed time; compass bearing) from which to construct what modifications are necessary to the record itself.

The chart shown in Fig. 14 which is produced by apparatus in which the main indicator has rectilinear instead of arcuate movement, gives the same indications as that shown in Fig. 11, corresponding portions of the traces being correspondingly designated. However, in Fig. 14 the transverse lines are straight instead of arcuate and the auxiliary trace $y$ merely shifts across the center line NS when the ship turns from a northerly to a southerly direction or vice versa. As in Fig. 11 the trace $y$ in Fig. 14 indicates, by its position relative to the center line, the general direction in which the ship is orientated, the main trace $x$ indicating the exact direction within the general direction. It will be observed that in Fig. 14 the traces $x$ and $y$ are extended at their lower ends somewhat farther than in Fig. 11 to show a turn of the ship from a northerly direction to due west at point $x''$ and then back again toward the north, the trace $y$ shifting to the center line at point $y''$ when the ship is directed due west and then back again to the right-hand side of the center line when the ship swings back toward the north instead of crossing the line as at $y'$ when the ship swings past due west from a northerly to a southerly direction.

In Fig. 15, which shows means for oscillating the auxiliary recorder N' to make a trace such as indicated at $y$ in Fig. 14, the parts 13'', 14'', 15'', 16'' and 18'' correspond to parts 13', 14', 15', 16' and 18' of Fig. 6 and may be similarly embodied in the instrument. The gears 13'' and 14'' have interrupted teeth so arranged that the gear 13'' is moved to the right or left as the teeth on gear 14'' move to the right or left past their upper central position and the gear 13'' has concave faces on each side of its teeth arranged to interfit with the circular periphery of the gear 14'' on the principle of the well-known intermittent gear to hold the gear 13'' against rotation when the gear teeth disengage. The gear 18'' has a tooth arranged to engage the lower end of mutilated gear 16'' for moving the indicator to the right or left depending upon the direction of rotation of gear 18'', the gear 14'' having a recess 14$^a$ to permit this latter movement. It will of course be understood that the parts are so arranged that the indicator N' is always under the positive control of one or the other of the gears 14'' and 18''. With this arrangement the auxiliary indicator oscillates to and fro in response either to continuous rotation of compass shaft 9 in either direction or to back and forth movement of the compass shaft as in the embodiments shown in Figs. 6 and 8, the only difference being that the oscillatory movement is limited to a smaller range (see Fig. 14).

The modification shown in Figs. 16 and 17, for moving the main recorder M' along a straight line to make a trace such as $x$ in Fig. 14, comprises a drum 101 adapted to be mounted on the end of the oscillatory shaft 11 (Figs. 1, 4, 5 and 7), drums 102 and 103 on opposite sides of the record sheet in tangential alignment with the drum 101, a steel ribbon belt 104 disposed in grooves in the drums and having its ends fast to drum 101 at 105 and 106, the belt 104 carrying the recorder M' substantially at its center. The circumference of the drum 101 is such that the oscillation of the shaft 11 as aforesaid causes the recorder to oscillate or reciprocate between the marginal lines of the record surface of the sheet B' to make a trace such as *x* in Fig. 14.

It will of course be understood that any one of the mechanisms herein disclosed for oscillating the main indicator or recorder, or any other suitable mechanism, may be employed with any one of the mechanisms for oscillating the auxiliary indicator or recorder.

For simplicity of expression in the claims the term "element" has been used to connote either a gaseous or a liquid fluid and the term "body" has been used to include either air, land or water craft, or other body; and the words are to be thus construed unless otherwise limited by the context of the claims.

I claim:

1. Apparatus for recording the orientation of an element comprising a recorder movable parallel to a record sheet to record changes in direction relatively to a predetermined direction, another recorder movable parallel to a record sheet to record changes in direction relatively to another predetermined direction, and means responsive to changes in the orientation of the element to produce the relative movement of said recorders.

2. Apparatus for recording the orientation of an element comprising a recorder movable over a section of a record sheet parallel thereto to record changes in direction relatively to a predetermined direction, another recorder moving over a section of the same record sheet parallel thereto to record changes in direction relatively to another predetermined direction, and means responsive to changes in the orientation of the element to produce the movement of the recorders.

3. Apparatus for recording the orientation of an element comprising a recorder movable parallel to a record sheet to record changes in direction relatively to a predetermined direction, another recorder movable parallel to a record sheet to record changes in direction relatively to a direction at right angles to said direction, and means responsive to changes in the orientation of the element to produce the relative movement of said recorders.

4. Apparatus for recording the orientation of a body comprising a compass, a recorder movable over a section of a record sheet for recording changes in direction relatively to a predetermined direction, another recorder moving over the same section of the same record sheet for recording changes in direction relatively to another predetermined direction, and means responsive to said compass for producing the movement of the recorders.

5. Apparatus for recording the orientation of a body comprising means for moving an elongate record sheet longitudinally, a compass carried by the body, a plurality of recorders movable to and fro transversely of said sheet, and mechanism for synchronously moving said recorders to and fro across said sheet in response to continuous rotation of said compass.

6. Apparatus for recording the course of a moving body on a record sheet comprising a recorder movable over a section of the record sheet to record changes in direction relatively to a predetermined direction, another recorder movable over the same section of the record sheet to record changes in direction relatively to another predetermined direction, and means responsive to changes in the orientation of said body to produce the movement of the recorders.

7. Apparatus for recording the course of a moving body on a record sheet travelling in proportion to the speed of the body, comprising a recorder movable parallel to the record sheet for recording the general direction of movement of the body, a recorder movable relatively to the record sheet for recording the exact direction within the general direction recorded by the first recorder, and means responsive to changes in the direction of the body for actuating the recorders.

8. Apparatus for recording the course of a moving body on a record sheet comprising a recorder movable parallel to the record sheet for recording the sector in which the body is orientated, a recorder movable relatively to the record sheet for recording the angular position of the body within each sector, and means responsive to angular movement of said body for controlling said recorders.

9. Apparatus for recording the course of a moving body on a record sheet travelling in proportion to the speed of the body, comprising a recorder movable relatively to the record sheet throughout the same range for recording the angular position of the body within each of a plurality of sectors, another recorder movable edgewise of the record sheet for recording the sector in which the body is directed, and means responsive to angular movement of the body for controlling said recorders.

10. Apparatus for recording the course of a moving body on a record sheet comprising a recorder movable parallel to the record sheet for recording the sector in which the body is orientated, an oscillatory recorder movable through an arc of a circle relatively to the record sheet for recording the angular position of the body within each sector, and means responsive to angular movement of said body for controlling said recorders.

11. Apparatus for recording the course of a moving body on a record sheet comprising a plurality of recorders movable to and fro transversely of said sheet, rotary means responsive to changes in the direction of said body, and mechanism for synchronously moving said recorders to and fro across said sheet in response to continuous rotation of said rotary means.

12. Apparatus for recording the course of a moving body on an elongate record sheet moving longitudinally in proportion to the speed of the body whether constant or variable, comprising a plurality of recorders movable to and fro transversely of said sheet, and compass responsive mechanism for synchronously moving said recorders to and fro across said sheet, in response to continuous rotation of a compass.

13. Apparatus for recording the course of a ship on an elongate record sheet movable longitudinally in proportion to the ship speed whether constant or variable, comprising a recorder movable across a width of said elongate sheet to record changes in direction relatively to a predetermined direction, another recorder movable across a width of said elongate sheet to record changes in direction relatively to another predetermined direction, and means responsive to changes in the direction of the ship to produce the movement of the recorders.

14. Apparatus for recording the course of a ship on an elongate record sheet movable longitudinally in proportion to the ship speed whether constant or variable, a recorder movable across a width of the elongate sheet for recording the general direction of movement of the ship, a recorder movable across a width of the elongate sheet for recording the exact direction within the general direction recorded by the first recorder, and means responsive to changes in the direction of the ship for actuating the recorders.

15. Apparatus for recording the course of a ship on an elongate record sheet movable longitudinally in proportion to the ship speed whether constant or variable, comprising a recorder movable across a width of the elongate sheet for recording the sector in which the ship is directed, an oscillatory recorder movable through the arc of a circle movable across a width of the elongate sheet for recording the angular position within each sector, and means responsive to changes in the direction of the ship for controlling said recorders.

16. Apparatus for recording the path of a moving body comprising means for moving an elongate record sheet longitudinally, recorders movable transversely across the moving sheet, and means for moving said recorders back and forth across the sheet in accordance with changes in the direction of the body, one recorder following the other recorder throughout each cycle of movement.

17. Apparatus for recording the path of a moving body comprising means for moving an elongate record sheet longitudinally, two recorders movable transversely across the moving sheet, means for maintaining one stylus in a predetermined width of the sheet while the body is directed in one direction and in a different width of the sheet while the body is directed in the opposite direction, and means for maintaining the other stylus in a predetermined width of the sheet when the body is directed in another direction and in a different width of the sheet when the body is directed in a direction opposite to said last direction.

18. Apparatus for recording the path of a moving body comprising means for moving an elongate record sheet longitudinally, two recorders movable transversely across the moving sheet, means for moving one recorder to one side of a longitudinal line on the sheet and the other stylus to the other side of said line when the body is directed in one direction and for moving each stylus to the opposite side of said line when the direction is reversed.

19. Apparatus for recording the path of a body comprising means for moving an elongate record sheet longitudinally, two recorders movable back and forth transversely of a line extending longitudinally of the sheet, the movement of one recorder relatively to said longitudinal line showing the direction of the body with reference to a predetermined line of direction and the movement of the other recorder relatively to said longitudinal line showing the direction of the body with reference to a line of direction at right angles to the first line of direction.

20. Apparatus for recording the direction of a body comprising means for moving an elongate record sheet longitudinally, two recorders movable back and forth transversely of a line extending longitudinally of the sheet, means for moving one recorder to either side of said line to indicate the direction of the body, one side indicating one direction and the other side the opposite direction, and means for moving the other recorder a distance from said line indicative of the deviation of the body from one of said directions.

21. Apparatus for recording the direction of a body comprising means for moving an elongate record sheet longitudinally, two recorders movable back and forth transversely of a line extending longitudinally of the sheet, means for moving either recorder to either side of said line to indicate each of four general directions, and means for moving one recorder a distance from said line indicative of the deviation of the body from the direction indicated by the other recorder.

Signed by me at Boston, Massachusetts, this 27th day of December, 1922.

GEORGE WALKER.